April 30, 1968   E. LANGEN ET AL   3,380,623
LAMINATED BODY
Filed July 11, 1966   2 Sheets-Sheet 1
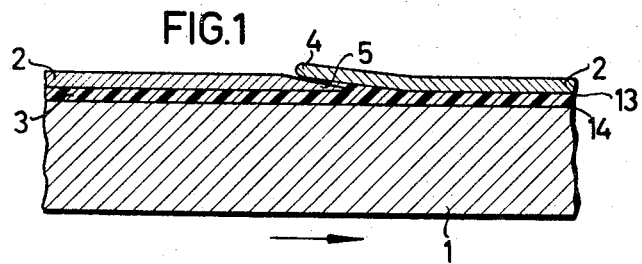
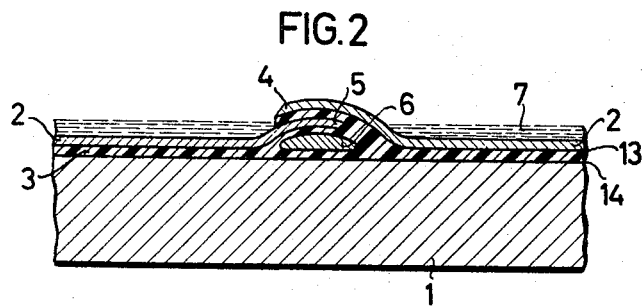
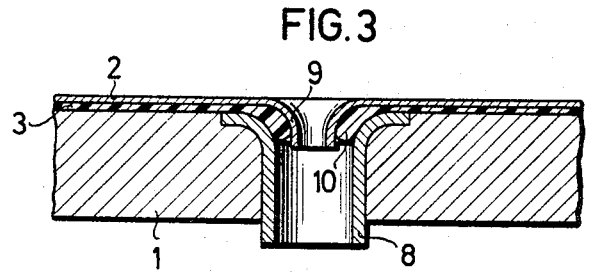
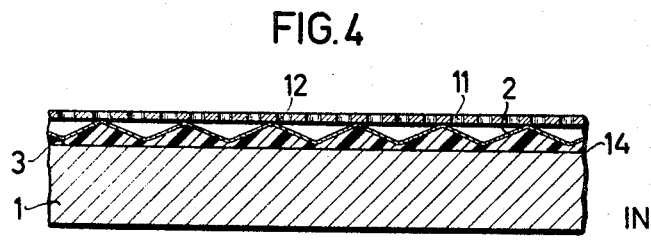
INVENTORS
Eugen Langen
and Kurt Paus
by Michael S. Striker
Attorney April 30, 1968     E. LANGEN ET AL     3,380,623

LAMINATED BODY

Filed July 11, 1966     2 Sheets-Sheet 2

INVENTORS
Jürgen Langen and
Kurt Pause
BY Michael S. Servito
ATTORNEY

United States Patent Office 3,380,623
Patented Apr. 30, 1968

3,380,623
LAMINATED BODY
Eugen Langen and Kurt Pause, Grevenbroich, Germany, assignors to Maschinenfabrik Buckau R. Wolf Aktiengesellschaft, Grevenbroich, Germany
Filed July 11, 1966, Ser. No. 564,716
Claims priority, application Germany, July 10, 1965, M 65,910
12 Claims. (Cl. 220—63)

The present invention relates to a laminated body. Specifically, the invention relates to a laminated body which is particularly adapted for use in the construction of rotating drums. Still more specifically, the invention relates to a laminated body in which the transmission of stresses originating in one of two superimposed layers of material to the other such layer is attenuated.

In the construction of rotary drums, and particularly in drums for use in centrifuges, especially those operating discontinuously, the frequent acceleration of the drum from a standing start requires a high expenditure of energy. To reduce the energy needed it is customary in the industry to attempt to reduce the mass of the drum by using the lightest possible material consistent with the stress requirements expected in the operation of the drum. The selection of materials is limited, however, by the necessity that the material must be corrosion-resistant since, if this is not the case, a safety factor must be added in the form of an increase in the wall thickness of the drum. The latter course naturally results in a concomitant increase in the mass to be accelerated.

Unfortunately, materials which, because of their low specific weight and the capability of withstanding stresses are suitable for the construction of such drums, do not have the required resistance to corrosion. Such materials are, for instance, aluminum and certain types of fine-grain steel. Nevertheless, these materials are generally the most suitable for the purpose and it has therefore been attempted to protect the materials against corrosion to add the missing performance factor.

Such protection has been achieved by bonding to the materials in question thin foils of corrosion resistant material. For instance, in known constructions of this type the foil is bonded to the material of the drum body by being rolled thereonto in heated condition or by being vulcanized thereto. The result of such known constructions has been that any stresses acting on one of the materials, namely the actual drum body or the corrosion resistant foil, is transmitted directly to the other material. Of course, the tensile strength of the material used for the drum body is substantially higher than that of the corrosion resistant foil so that, if the drum body is subjected to stresses approaching its permissible limit, the stresses which are transmitted to the corrosion resistant foil are so high that they exceed the lower permissible limit of the corrosion resistant material with the result that the latter ruptures. For example, if a fine-grain steel with a permissible limit of tensile stress of 44 kg./mm.$^2$ and an elasticity modulus of 21,000 kg./mm.$^2$ is used and is integrally bonded to a corrosion-resistant steel foil having a permissible tensile-stress limit of 25 kg./mm.$^2$ and a modulus of elasticity of 20,300 kg./mm.$^2$, then the expansion coefficient of the fine-grain steel, that is the drum body, is 0.0021. This results in a tensile-stress limit for the corrosion resistant foil of 0.0021 times 20,300, or 42.7 kg./mm.$^2$ which is subtantially above the permissible tensile-stress limit of 25 kg./mm.$^2$ for the corrosion resistant foil. Taking another example, if an aluminum material is used for the drum body having a permissible tensile-stress limit of 13 kg./mm.$^2$ and a modulus of elasticity of 7000 kg./mm.$^2$, and assuming that the corrosion resistant foil has the same characteristics as outlined above with respect to the first example, then the foil will be subjected to a tensile-stress limit of 37.7 kg./mm.$^2$, which obviously exceeds very substantially the permissible limit.

It is therefore a general object of the present invention to overcome the above-mentioned disadvantages of the prior art.

A more specific object of the present invention is to provide a laminated body in which the transmission of stresses between two superimposed layers of material is attenuated.

A further object of the invention is to provide such a body which is considerably more resistant to stresses than is known from the prior art.

An additional object of the invention is to provide a body of the type described which is simple and economical to manufacture.

In accordance with the invention, specifically one feature of my invention, I provide a laminated body comprising a pair of outer layers which consist of materials having first moduli of elasticity, and also an inner layer sandwiched between and bonded to the outer layer. The material of the inner layer has a modulus of elasticity which is smaller than that of either layer of the pair of outer layers so that stresses which originate in one layer of the pair are transmitted to the other layer of the pair through the intermediary of the inner layer and are thereby reduced in magnitude.

This construction is applicable, of course, not only to drums but to other constructions in which the attenuation of stress transmission from one to another layer is necessary. However, while this should be fully understood the invention will herein be described with reference to the construction of a rotary drum, such a specific application serving well as an example for explaining the invention.

The intermediate layer which is sandwiched between the outer layers which latter, it will be understood, will generally at least in drums have different moduli of elasticity with lower modulus being that of the inner corrosion-resistant foil, will consist of an elastic material, for instance rubber or one of the many plastic material which are suitable for this purpose. The intermediate layer has a modulus of elasticity which is significantly smaller than the moduli of elasticity of the other two layers, namely the outer layers. It is bonded to the outer layers in a suitable manner and serves to assure that the two outer layers can expand at different rates without the stress created in the layer with the greatest expansion being directly transmitted to the layer having the lesser expansion capability and damaging the same. In accordance with a further feature of the invention the laminated structure consisting of the two outer layers and the inner layer sandwiched therebetween will be overlapped at its respective ends so that a seam is formed which extends in parallelism with the axis of the drum Thus, any relative shifts between the outer layers remains localized and is compensated-for at the overlapped edges. As a result of this construction the intimate bonded connection between the three layers remains undamaged despite differential expansion of the two outer layers.

In accordance with a further feature of my invention the overlapping end edges of the laminated structure will be so arranged that the overlap faces in the direction oppositely the direction of rotation of the drum. This assures that, while the speed of rotation of the drum increases, the fluid received within the drum will flow over the overlap without penetrating therethrough whereas, when the fluid has attained the speed of the rotating drum, it will be subjected to the full static pressure which corresponds to the respective speed of rotation. In order, now, to alleviate this static pressure which of course also acts upon the overlapped seam, I provide in accordance with a further feature of my invention an insert which is so arranged along the overlapped seam that the same projects inwardly beyond the inner surface of the drum and is no longer submerged in the fluid when the latter has attained the speed of rotation of the drum.

In cases where the drum is of the perforated type I provide an arrangement whereby a tubular member of corrosion resisting material is inserted into each of the perforations and the foil together with the elastic inner layer is partially pressed into each of these tubular members. In cases where the drum is provided with a separate inner sieve, the need for the customary support for the sieve can be eliminated if the foil is of the corrugated type so that the sieve can be supported on the crest of the respective corrugations. In this case the ends of the foil can be joined together without the need for overlapping because, although the foil in this construction is subjected to relatively large expansion stresses, the stresses stay within the permissible limits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a developed section of a drum incorporating the present invention;

FIG. 2 is a view substantially similar to FIG. 1, but showing the strip inserted into the overlapped seam to raise the same;

FIG. 3 is a view similar to FIG. 1, but showing the application of the present invention to a perforated drum;

FIG. 4 is a view similar to the preceding views, but showing the application of the present invention to a drum having a separate inner sieve.

Figure 5:
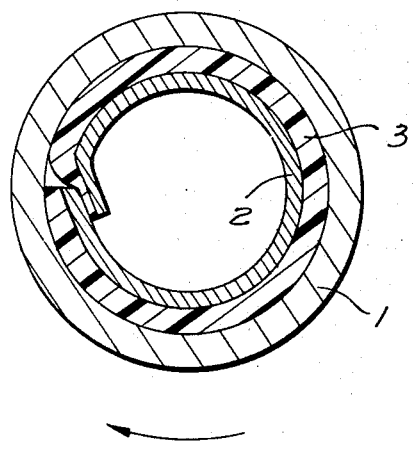
FIG. 5 is a section transversely of the axis of a drum incorporating the present invention.

Discussing now the drawing in detail, and firstly FIG. 1 thereof, it will be seen that reference numeral 1 indicates the outer layer, that is the drum body. Reference numeral 2 indicates the inner layer, that is the foil of corrosion resistant material. Reference numeral 3, finally, indicates the layer of elastic material which, as has been pointed out before, advantageously consists of a suitable synthetic plastic material. The reference numerals shown in FIG. 1 are identical in all of the other embodiments shown.

The arrow shown in FIG. 1 indicates the direction of rotation of the drum and it will be seen that the end edges 4 and 5 of the foil 2 are overlapped with one another so that the overlying end edge 4 points in direction oppositely the direction of rotation of the drum, the latter being indicated by the arrow.

The layer 3 is bonded along its respective surfaces 13 and 14 to the layers 1 and 2, for instance by a suitable synthetic plastic adhesive or any other suitable material or process.

Coming now to FIG. 2, it will be seen that this is substantially the same as FIG. 1. The difference here is that a strip 6 is placed along and underneath the seam constituted by the overlapped end edges 4 and 5 so as to raise the seam above the level of liquid, which is indicated by reference numeral 7, whereby to prevent intrusion of liquid through the seam and contact with such liquid with the outer layer 1. Again, as in FIG. 1, the overlapped end edge 4 in FIG. 2 points oppositely the direction of rotation of the drum which, in all embodiments of FIGS. 1–4, is assumed to be the same as that indicated by the arrow in FIG. 1.

FIG. 3 shows the application of the invention in conjunction with a perforated drum. In other words, the outer layer 1 is perforated and inserted into each such perforation is a tubular member or bushing 8. The foil 2 is pressed into this bushing 8 in form of a collar 9. The elastic layer 3 is sandwiched between the layers 1 and 2 in the usual manner and it will be understood that the deformation of the layer 2 to form the collar 9 causes a displacement of the layer 3 at the points adjacent the collar 9, this resulting in a thickening 10 of the layer 3 underneath the collar 9.

Coming now to the embodiment of FIG. 4 it will be seen that there is here provided a layer 2 in corrugated form. The intermediate elastic layer 3 of course fills the corrugations and conforms to the shape of the same. The separate sieve can in this embodiment rest on the crests 12 of the corrugations of layer 2 and thus obviate the customary support which is usually necessary in constructions of this type known from the prior art FIG. 5, finally, shows a section taken transversely of the axis of a drum and the various layers are again identified with reference numerals 1, 2 and 3. A more detailed discussion of this figure is not believed to be necessary since it merely serves to illustrate the complete structure in drum form. The arrow indicates the direction of rotation of the drum.

The functioning of the invention will be obvious from what has been said before. When a drum constructed in accordance with the present invention rotates, centrifugal forces acting on the outer layer or drum body 1 cause an expansion of the latter which, as a result of the integral connection between the layers 1 and 3 is transmitted to the elastic layer 3. However, because of its lower modulus of elasticity the layer 3 transmits only a small portion of this expansion to the corrosion resistant foil 2 so that expansion stresses occurring in the latter are maintained within permissible limits. The differences between expansion in the layers 1 and 2 are compensated for by shifts within the material of the layer 3. Thus, the invention permits the combination of two materials for the use of the intermediate elastic layer 3 in such a manner that the materials can be fully utilized within their technological limits without, however, being stressed beyond these limits.

It will be understood that each of the elements described above, or two or more together, may also find a useful application in other types of a laminated body differing from the types described above.

While the invention has been illustrated and described as embodied in laminated bodies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A laminated body comprising a pair of outer layers consisting of materials having first moduli of elasticity; and an inner layer sandwiched between and bonded to said pair of layers, the material of said inner layer having a modulus of elasticity smaller than that of either layer of said pair.

2. A body as defined in claim 1, wherein the moduli of elasticity of said outer layers differ from one another, stresses which originate in that outer layer which has the greater modulus of elasticity being transmitted to the other outer layer through the intermediary of said inner layer and at reduced magnitude.

3. A body as defined in claim 1, wherein one of said outer layers constitutes the shell of a rotatable drum and the other of said outer layers constitutes a lining of said shell.

4. A body as defined in claim 3, wherein said one outer layer has a higher modulus of elasticity than the other outer layer.

5. A body as defined in claim 3, wherein spaced parallel edge portions of the respective layers overlap one another so as to form an elongated joint in parallelism with the axis of said drum.

6. A body as defined in claim 5, wherein the overlapped one of said edge portions overlies the other edge portion in direction opposite the direction of rotation of said drum.

7. A body as defined in claim 6; and further comprising lifting means underlying said joint so that the latter projects inwardly beyond the inner surface of said drum.

8. A body as defined in claim 2, wherein said outer layers consist of steel, and wherein said inner layer consists of elastic material.

9. A body as defined in claim 2, wherein said inner layer consists of synthetic plastic material.

10. A body as defined in claim 2, wherein at least one of said outer layers consists of aluminum.

11. A body as defined in claim 3, wherein said one outer layer is provided with a plurality of perforations; and further comprising tubular elements of corrosion-resistant material inserted into said perforations, the material of the other layer and of said inner layer being discontinuous at said perforations and being deformed so as to extend inwardly into the respective tubular elements.

12. A body as defined in claim 3, wherein the other of said layers is provided with corrugations extending parallel with the axis of said drum, said inner layer being of a configuration to fill the interstices between said one and said other layer; and further comprising tubular sieve means received within said drum and supported on the crests of said corrugations.

References Cited

UNITED STATES PATENTS 3,137,405   6/1964   Gorcey _____ 220—63

THERON E. CONDON, *Primary Examiner.*

G. T. HALL, *Assistant Examiner.*